(12) United States Patent
Spani

(10) Patent No.: US 8,080,166 B2
(45) Date of Patent: *Dec. 20, 2011

(54) MULTI-PHASE SEPARATION METHOD

(75) Inventor: Wayne W. Spani, Mission Viejo, CA (US)

(73) Assignee: Liquid Separation Technologies and Equipment, LLC, Mission Viego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/573,773

(22) Filed: Oct. 5, 2009

(65) Prior Publication Data

US 2010/0018935 A1      Jan. 28, 2010

Related U.S. Application Data

(63) Continuation of application No. 10/564,673, filed as application No. PCT/US2004/021880 on Jul. 9, 2004, now Pat. No. 7,597,803, which is a continuation-in-part of application No. 10/619,071, filed on Jul. 12, 2003, now Pat. No. 7,087,157.

(51) Int. Cl.
*C02F 1/20* (2006.01)
(52) U.S. Cl. .............. 210/774; 95/247; 95/257; 203/11; 203/22; 203/47; 210/799; 210/804
(58) Field of Classification Search .................... 95/160, 95/170
See application file for complete search history.

(56) References Cited

U.S. PATENT DOCUMENTS

| | | |
|---|---|---|
| RE15,866 E | 6/1924 | Elliott |
| 2,939,544 A | 6/1960 | Walker et al. |
| 3,285,832 A | 11/1966 | Sephton |
| 3,533,917 A | 10/1970 | Williams |
| 3,645,398 A | 2/1972 | Fiocco |
| 3,898,058 A | 8/1975 | McGill |
| 4,019,977 A | 4/1977 | Hachadoorian et al. |

(Continued)

FOREIGN PATENT DOCUMENTS

JP     58185717     10/1983

OTHER PUBLICATIONS

Beck, Andreas and Schulinger, Wayne, Fifth Forum on Innovative Hazardous Waste Treatment Technologies: Domestic and International. "A New Air Stripping Method to Economically remove VOCS from Groundwater", p. 121-124 (1994).

(Continued)

*Primary Examiner* — Peter A Hruskoci
(74) *Attorney, Agent, or Firm* — Knobbe, Martens, Olson & Bear LLP

(57) ABSTRACT

A multiphase separation system utilized to remove contaminants from fluids includes a pre-filtering module for filtering a contaminated fluid to provide a filtered contaminated fluid. A condenser module receives the filtered contaminated fluid and a contaminated gas phase for condensing the contaminated gas phase to a contaminated liquid. A phase reaction chamber converts the filtered contaminated fluid to a contaminated mist wherein the mist is subjected to a low energy, high vacuum environment for providing a first change of phase by separating into a contaminated gas phase and a liquid mist phase. The contaminated gas phase is carried out of the phase reaction chamber by a carrier air. A vacuum pump provides the low energy, high vacuum environment in the phase reaction chamber and delivers the contaminated gas phase to the condenser module for condensation providing a second change of phase.

11 Claims, 6 Drawing Sheets

U.S. PATENT DOCUMENTS

| | | | |
|---|---|---|---|
| 4,235,680 A | 11/1980 | Diggs | |
| 4,343,683 A | 8/1982 | Diggs | |
| 4,401,569 A | 8/1983 | Jhaveri et al. | |
| 4,436,764 A | 3/1984 | Nakazima et al. | |
| 4,444,571 A | 4/1984 | Matson | |
| 4,518,503 A | 5/1985 | Fermaglich | |
| 4,601,789 A | 7/1986 | Bjorklund | |
| 4,608,163 A | 8/1986 | Yohe et al. | |
| 4,659,347 A | 4/1987 | Schrems | |
| 4,663,089 A | 5/1987 | Lowry et al. | |
| 4,713,089 A | 12/1987 | Robbins | |
| 4,842,748 A | 6/1989 | Agnihotri et al. | |
| 4,890,673 A | 1/1990 | Payne | |
| 4,900,336 A | 2/1990 | Pittner et al. | |
| 4,957,624 A | 9/1990 | Peranio | |
| 4,979,886 A | 12/1990 | Rippberger | |
| 5,032,230 A | 7/1991 | Shepherd | |
| 5,104,525 A | 4/1992 | Roderick | |
| 5,122,165 A | 6/1992 | Wang | |
| 5,122,166 A | 6/1992 | Hyrcyk et al. | |
| 5,167,838 A * | 12/1992 | Wilensky | 210/768 |
| 5,176,798 A | 1/1993 | Rodden | |
| 5,183,563 A | 2/1993 | Rodden | |
| 5,246,584 A | 9/1993 | Donaldson | |
| 5,273,572 A | 12/1993 | Baker et al. | |
| 5,304,704 A | 4/1994 | Kammeraad | |
| 5,352,276 A | 10/1994 | Rentschler et al. | |
| 5,368,754 A | 11/1994 | Von Klock et al. | |
| 5,383,958 A | 1/1995 | Battaglia | |
| 5,389,126 A | 2/1995 | Baker et al. | |
| 5,389,208 A | 2/1995 | Beasley et al. | |
| 5,413,717 A | 5/1995 | Webster, Jr. et al. | |
| 5,424,045 A | 6/1995 | Orman et al. | |
| 5,441,365 A | 8/1995 | Duffney et al. | |
| 5,458,739 A * | 10/1995 | Boucher et al. | 202/153 |
| 5,562,834 A | 10/1996 | Bremer et al. | |
| 5,595,586 A | 1/1997 | Sivavec | |
| 5,614,100 A | 3/1997 | Gallup | |
| 5,618,417 A | 4/1997 | Spindler | |
| 5,650,128 A | 7/1997 | Holst et al. | |
| 5,707,528 A | 1/1998 | Berry | |
| 5,766,457 A | 6/1998 | Spindler | |
| 5,767,060 A | 6/1998 | Hanrahan | |
| 5,769,927 A | 6/1998 | Gottschlich et al. | |
| 5,772,734 A | 6/1998 | Baker et al. | |
| 5,785,739 A | 7/1998 | Baker | |
| 5,787,537 A | 8/1998 | Mannillo | |
| 5,836,718 A | 11/1998 | Price | |
| 5,863,510 A | 1/1999 | Pozniak et al. | |
| 5,914,091 A | 6/1999 | Holst et al. | |
| 5,948,279 A | 9/1999 | Chang et al. | |
| 5,993,608 A | 11/1999 | Abry et al. | |
| 6,024,882 A | 2/2000 | McNeilly et al. | |
| 6,036,748 A | 3/2000 | Wallace et al. | |
| 6,110,361 A | 8/2000 | Bower et al. | |
| 6,123,750 A | 9/2000 | Espinal | |
| 6,136,204 A | 10/2000 | Krejci | |
| 6,158,924 A | 12/2000 | Athens et al. | |
| 6,197,095 B1 | 3/2001 | Ditria et al. | |
| 6,197,162 B1 | 3/2001 | Quiros | |
| 6,197,206 B1 | 3/2001 | Wasinger | |
| 6,224,716 B1 | 5/2001 | Yoder | |
| 6,277,175 B1 | 8/2001 | Halder et al. | |
| 6,299,781 B1 | 10/2001 | Hanrahan | |
| 6,321,837 B1 | 11/2001 | Doering et al. | |
| 6,375,803 B1 | 4/2002 | Razzaghi et al. | |
| 6,503,395 B1 | 1/2003 | Salanitro et al. | |
| 6,508,916 B1 | 1/2003 | Razzaghi et al. | |
| 6,635,149 B1 | 10/2003 | Campbell et al. | |
| 6,660,239 B2 | 12/2003 | Nagji | |
| 6,740,205 B2 | 5/2004 | Molintas | |
| 6,932,889 B1 | 8/2005 | Holcomb | |
| 7,000,409 B2 | 2/2006 | Mazzetti | |
| 7,041,198 B2 | 5/2006 | Atwell | |
| 7,087,157 B2 | 8/2006 | Spani | |
| 7,163,636 B2 * | 1/2007 | Spani | 210/774 |
| 7,597,803 B2 * | 10/2009 | Spani | 210/180 |
| 2002/0053507 A1 | 5/2002 | Belmar | |
| 2002/0162805 A1 | 11/2002 | Shenoi | |
| 2003/0094100 A1 * | 5/2003 | Page | 95/263 |

OTHER PUBLICATIONS

Dytnersky, Yu.I. "Processes and Apparatus in Chemical Technologies," Part 1, Khimia Publisher, Moscow, 1995, pp. 212-216 [3].

International Search Report for corresponding to PCT Application PCT/US2004/021880.

Russian Office Action for corresponding case in Russia, received in email sent on Oct. 27, 2008.

* cited by examiner

MULTI-PHASE SEPARATION METHOD

CROSS-REFERENCE TO RELATED APPLICATIONS

This application is a continuation of U.S. patent application Ser. No. 10/564,673 to Spani, entitled "Multi-Phase Separation System," filed Jun. 30, 2006, which is a U.S. National Phase under 35 U.S.C. §371 of prior PCT International Application No. PCT/US04/21880, filed Jul. 9, 2004, which is a continuation-in-part of U.S. patent application Ser. No. 10/619,071 to Spani, filed Jul. 12, 2003, now issued as U.S. Pat. No. 7,087,157 on Aug. 8, 2006, the disclosures of which are hereby expressly incorporated by reference in their entireties.

BACKGROUND OF THE INVENTION

1. Technical Field

The present invention relates to the elimination of pollution from groundwater. More specifically, the present invention relates to methods and apparatus for a multi-phase separation system typically utilized to remove the chemical additives Methyl Tertiary-Butyl Ether (MTBE) and Volatile Organic Compounds (VOC's) from fluids such as groundwater.

2. Description of the Related Art

The prior art is directed to methods and apparatus for removing chemical additives from fluids such as groundwater.

Methyl Tertiary-Butyl Ether (hereinafter "MTBE") is a synthetic organic chemical primarily utilized as a fuel additive or oxygenate and was initially blended in gasoline to increase octane ratings after the phase-out of lead and aromatics. Thus, MTBE was intended to (a) to enhance the combustion of gasoline by keeping fluids in solution within the gasoline so the fluids do not freeze and foul engine components, and (b) to reduce air polluting nitrogen oxygen compound emissions (typically referred to as NOX emissions such as NO and N02) by increasing the rate and efficiency of oxidation of fuels during combustion. The use of the MTBE oxygenate increased Significantly when oil companies were required to comply with legislative actions and accompanying regulations regarding air pollution, i.e., to meet the requirements and standards of the Environmental Protection Agency (EPA) and the states.

MTBE became one of the most produced chemicals in the United States and the most important market was in the State of California. As a result of the use of MTBE as a gasoline oxygenate, the air quality in California has improved. However, drinking water wells have been contaminated by MTBE as a result of leaking underground gasoline storage tanks that contained the MTBE oxygenate. These and other reported contaminations have resulted in a public debate directed to the benefits and drawbacks of the use of the MTBE oxygenate. Studies conducted by the University of California directed to the health consequences and environmental assessment of MTBE are ongoing.

MTBE is typically added. to gasoline during the refining process, transferred to terminals, loaded into transport trucks, and finally distributed to gasoline dispensing stations. At the dispensing stations, the gasoline including the MTBE and VOC additives Is stored in underground tanks and usually enters the groundwater by (1) escaping from leaking tanks, piping and valves. Other ways for MTSE to enter the environment include (2) incomplete combustion of internal combustion engines, (3) spillage and evaporation during the manufacture and transportation of MTBE and gasoline containing MTBE (including the transport through underground pipelines), (4) water craft exhaust especially from two-cycle engines, and (5) spillage and evaporation when vehicles and water craft are refueled. MTBE is a carcinogen, i.e., cancer causing in humans, and a pollutant when in groundwater and Is highly "hydro-scopic", i.e., it has a high affinity for water.

A Volatile Organic Compound (hereinafter "VOC") is considered hazardous to humans and can also be a carcinogen in humans. VOCs are also included in gasoline and include benzene, xylene and ethylene to name a few. These chemicals are also typically used in many heavy industrial applications and processes such as, for example, those of the steel industry. In particular, the example chemicals of benzene, xylene, and ethylene can be found in solvents, paints, printing materials, coating materials, thinners and the like. Both MTBE and VOC can leak from storage tanks and associated piping, fittings and valves, and can also be released during fuel spills, water craft exhaust and the like. A specific example of leakage problems has occurred in the recent past in Santa Monica, Calif. where it was discovered that single-walled gasoline storage tanks were leaking gasoline including the MTBE and VOC additives into the soil and eventually entering the underlying water table. Regulators required the replacement of the single-walled storage tanks with double-walled storage tanks. However, the water table had already been polluted.

Once spilled onto the soil, the gasoline including the chemicals MTBE and VOC form a gas plume, i.e., a column of fluid material that is absorbed into the soil. As the column of fluid sinks further into the soil, the gas plume becomes wider and the soil becomes saturated with the chemicals. The groundwater, in effects, attracts the MTBE and VOC's. Because of the "hydroscopic" nature of MTBE, the MTBE tends to separate from the gas plume and seek the groundwater because the groundwater is denser. Unfortunately, the MTBE eventually reaches the groundwater resulting in pollution thereof. The groundwater, once polluted with these chemicals, becomes unfit for human consumption, bathing, agriculture irrigation and the like. Consequently, the clean-up and removal of these chemicals after spillage becomes very important to preserving the quality of groundwater for both the human and animal species.

Much effort has been directed to perfecting apparatus and methods for removing leaked or spilled MTSE and/or VOC's from the soil and groundwater. Two patents which are directed to this purpose and which are typical of the prior art include U.S. Pat. No. 5,863,510 issued to Pozniak et al. on Jan. 26, 1999 entitled Modular Interchangeable Treatment System, and U.S. Pat. No. 5,104,525 issued to Roderick on Apr. 14, 1992 and entitled Portable Self-Contained Water Remediation Package. Pozniak et al. '510 purport to disclose in FIG. 5 a treatment plant 250 which includes a spray aeration, vacuum extraction unit 251. Beginning in the last paragraph of column 8, Pozniak et al. purport to disclose preheated water from a pre-heater 261 that is introduced through nozzles 264 to a spray aeration tank 263 of the vacuum extraction unit 251. Pozniak et al. states that due to the combined effects of heating the contaminated water in heat exchanger 267 and the vacuum created by vacuum pump 262, the majority of the VOC's in the contaminated water are volatilized and the vapor from the nozzles 264, 268 is pulled out of the spray aeration tank 263 by vacuum pump 262 and subsequently destroyed in the internal combustion engine 290.

In the art, Pozniak et al. '510 actually teaches an air sparging system which sprays the contaminated water into the base of the spray aeration tank 263 via nozzles 264 and 268 and pump 266. Air is introduced and the contaminated water Is heated by the heat produced by the Internal combustion engine 290. The re-circulated water is heated and contacts the air in the top of the aeration tank 263. The air releases and strips the contaminants from the contaminated water and the contaminants are burned in the internal combustion engine 290 or release to atmosphere. Pozniak et al. in effect teach a heated water re-circulation (multi-pass) system exhibiting a single change of phase where a high vacuum does not exist in the aeration tank 263.

Roderick '525 discloses 'a similar air stripper system as shown in FIG. 6 which employs a basin pump 74 to drive contaminated fluid into stripper column sections 14 and 16. An electric driven air pump 66 conveys air under pressure through conduit 68 and into the air stripper column 14 and upward through packing 62 to contact contaminated water passing there through to separate volatile contaminants from the contaminated water. The volatile contaminants are then carried out the upper end of the stripper column while the cleansed water is drawn from the lower portion of the stripper column 14. Roderick '525 fails to disclose the use of a high vacuum environment in the removal of the contaminants.

Thus, there is a need in the art for a multi-phase separation system typically utilized to remove the chemical additives Methyl Tertiary-Butyl Ether (MTBE) and Volatile Organic Compounds (VOC's), i.e., contaminants, from fluids such as groundwater comprising a prefiltering module to provide a filtered contaminated fluid for delivery to a condenser module which utilizes the cooler contaminated fluid to condense a contaminated gas phase to a contaminated liquid for disposal, a phase reaction chamber which operates under a high vacuum-low vapor pressure environment for separating and carrying away the contaminated gas phase from the contaminated fluid in a first change of phase, the contaminated gas phase being condensed to the contaminated liquid in a second change of phase.

SUMMARY OF THE INVENTION

Briefly, and in general terms, the present invention provides a new and improved multi-phase separation system typically utilized to remove the chemical additives Methyl Tertiary-Butyl Ether (MTBE) and Volatile Organic Compounds (VOC's) from fluids such as groundwater. The present invention can be used to decontaminate groundwater after spillage or leakage of processed gasoline containing Methyl Tertiary-Butyl Ether (MTBE) from fuel storage tanks and Volatile Organic Compounds (VOC's) also utilized in gasoline and in various industrial environments such as in the steel industry. The multi-phase separation system is designed to receive contaminated fluid such as ground water and to discharge fluid meeting the water quality requirements of the Environmental Protection Agency (EPA) and suitable for human consumption and usage.

In general, the ground water has become contaminated by the release of gasoline which includes the MTBE and VOC additives stored in underground tanks. This release typically occurs by the gasoline escaping from leaking tanks, piping and valves, or by spillage and evaporation during the manufacture and transportation of MTBE and gasoline containing MTBE (including the transport through underground pipelines), and spillage and evaporation when vehicles and water craft are refueled. Since MTBE is a carcinogen and is highly "hydro-scopic", i.e., it has a high affinity for water, spillage is a serious problem. Likewise, a Volatile Organic Compound (hereinafter "VOC") is considered hazardous to humans and can also be a carcinogen. VOCs are also included in gasoline and include benzene, xylene and ethylene to name a few.

In a preferred embodiment, a pre-filtering and pre-separating module receives contaminated groundwater, separates contaminates not in solution, and filters out and collects oils and greases on a polypropylene screen. A primary flow control module includes a surge tank having a level control system employed to control a centrifugal pump which regulates the liquid flow throughout the entire system. A micron filtration bank module is employed for filtering out particles larger than 5-microns for eliminating sediment. A contaminant condenser module utilizes the cooler filtered fluid from the micron filtration bank module as a cooling medium to condense the contaminated gas phase emitted from a phase reaction chamber. A media temperature equalization module functions to equalize the temperature of the contaminated fluid from the contaminate condenser module with a source of carrier atmospheric air prior to entering the phase reaction chamber for minimizing the probability of collateral reactions occurring within the phase reaction chamber.

The phase reaction module is employed to convert the contaminated fluid to an atomized mist which is subjected to a high vacuum-low vapor pressure environment for providing a first change of phase in a phase separation process causing the contaminated fluid to separate into the contaminated gas phase (MTBE & VOC's) and a liquid mist phase as a result of exposure to high vacuum and temperature of the media. The fluid mist component gravity drains downward to a vacuum liquid discharge tank while the contaminated gas phase Is carried upward via a carrier air drawn by the vacuum through the phase reaction chamber, a mist eliminator, valves and controllers. A vacuum pump module comprises a liquid sealed vacuum pump for drawing the vacuum in the phase reaction chamber for carrying the contaminated gas phase to the contaminant condenser module for capturing and condensing the contaminated gas phase to a contaminated liquid, and temporarily storing the contaminated liquid. A liquid discharge monitoring module is employed for constantly monitoring, sampling and analyzing a discharge liquid from the vacuum liquid discharge tank of the phase reaction module.

The present invention is generally directed to a multi-phase separation system typically employed to remove the chemical additives Methyl Tertiary-Butyl Ether (MTBE) and Volatile Organic Compounds (VOC's) from fluids such as groundwater. In its most fundamental embodiment, the multi-phase separation system for use in removing contaminants from fluids Includes a pre-filtering module for receiving and filtering a contaminated fluid to provide a filtered contaminated fluid. A condenser module receives the filtered contaminated fluid and a contaminated gas phase for condensing the contaminated gas phase to a contaminated liquid. A phase reaction module comprising a phase reaction chamber converts the filtered contaminated fluid to a contaminated mist wherein the contaminated mist is subjected to a low energy, high vacuum environment for providing a first change of phase by separating into a contaminated gas phase and a liquid mist phase. The contaminated gas phase is carried out of the phase reaction chamber by a carrier air. A vacuum pump provides the low energy, high vacuum environment in the phase reaction chamber and delivers the contaminated gas phase to the condenser module for condensation to provide a second change of phase.

These and other objects and advantages of the present invention will become apparent from the following more detailed description, taken in conjunction with the accompanying drawings which illustrate the invention, by way of example.

DETAILED DESCRIPTION OF THE PREFERRED EMBODIMENT

Figure 1:
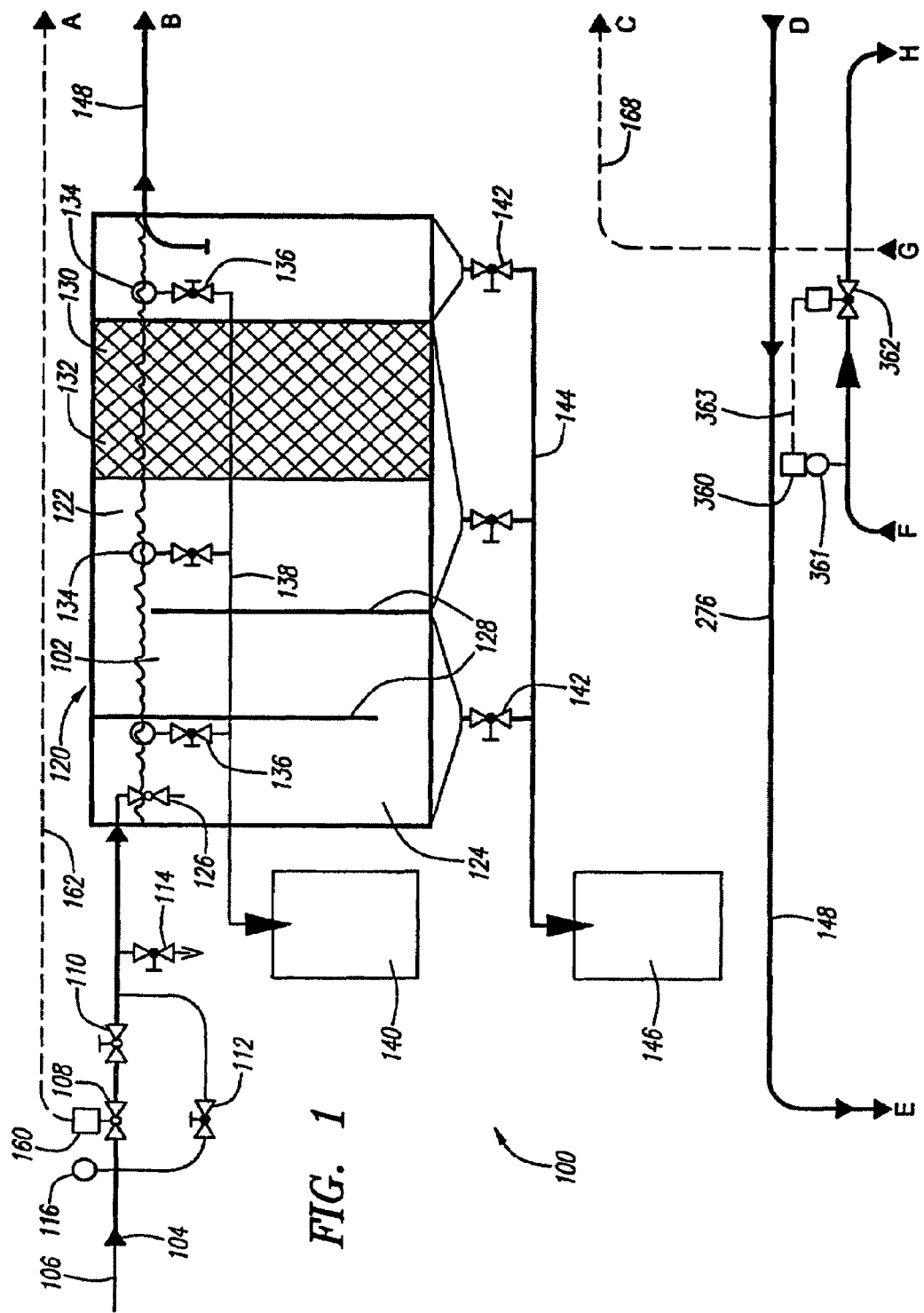
FIG. 1 is a mechanical schematic diagram showing a pre-filtering and pre-separating module including a contaminated groundwater source, a specific gravity separator, a liquid waste storage tank, a solid waste storage tank, and portions of a phase reaction module.

The present invention is a multi-phase separation system 100 typically utilized to remove chemical fuel additives such as Methyl Tertiary-Butyl Ether (hereinafter MTBE) and Volatile Organic Compounds (hereinafter VOC's) from fluids, such as groundwater 102 from a contaminated water source indicated by an arrow 104 in FIG. 1. The multi-phase separation system 100 can be used to decontaminate groundwater 102 after spillage or leakage of processed gasoline containing Methyl Tertiary-Butyl Ether (MTBE) from fuel storage tanks (not shown) and Volatile Organic Compounds (VOC's) also utilized in gasoline and in various industrial environments such as in the steel industry. The multiphase separation system is designed to receive contaminated fluid such as ground water 102 and to discharge liquid meeting the Environmental Protection Agency (EPA) water quality requirements and thus suitable for human consumption and usage.

In general, the ground water 102 becomes contaminated by the release of gasoline which includes the MTBE and VOC additives stored in underground tanks. This release typically occurs by the gasoline escaping from leaking tanks, piping and valves, or by spillage and evaporation during the manufacture and transportation of MTBE and gasoline containing MTBE (including the transport through underground pipelines), and spillage and evaporation when vehicles and water craft are refueled. Additional ways in which MTBE and VOC's enter the groundwater and/or soil is by incomplete combustion in internal combustion engines, and water-craft exhaust particularly from two-cycle engines. Since MTBE is a carcinogen and is highly "hydro-scopic", i.e., it has a high affinity for water, spillage is a serious problem. Likewise, a Volatile Organic Compound (VOC) is considered hazardous to humans and can also be a carcinogen. VOC's are also included in gasoline and include benzene, xylene and ethylene to name a few.

The multi-phase separation system 100 is a Simple and effective means of removing the MTBE and VOC's. (typically other volatile hydrocarbon contaminants) contained in the influent streams of groundwater 102 from a surface or subsurface contaminated groundwater source 104. An Important feature of the present invention is the utilization of a low energy, high vacuum environment to reduce the vapor pressure of the MTBE and/or VOC contaminant below the boiling point so that the MTBE and/or VOC contaminant vaporizes off of the contaminated ground water 102. Thus, the low energy, high vacuum environment is employed to convert the MTBE and/or VOC's from a water soluble state to a vapor state that can be condensed into a liquid for recycling or disposal. It Is noted that Henry's Law of Constants is utilized to achieve the desired result of reducing the concentration of MTBE in the contaminated groundwater 102 to below five parts-per-billion.

In the illustrated preferred embodiment shown in the accompanying drawing FIGS. 1-6, the present invention includes eight modules. Each module includes components of structure including various valves and parameter instrumentation. The valves and parameter instrumentation will be generally described to provide a complete disclosure. Downstream from the contaminated groundwater source in FIG. 1 in an influent line 106 is a normally-open control valve 108 in series with a normally-open ball valve 110. A normally-closed bypass valve 112 bypasses both the control valve 108 and the ball valve 110. A groundwater sample valve 114 taps off of the influent line 106 for providing a test sample of the incoming contaminated groundwater 102. Further, a pressure gauge 116 for indicating pressure within the range of 0-60 psig is also connected to the influent line 106. These parameter devices serve as inlet controls that regulate the flow of the contaminated groundwater to the specific gravity separator 122.

The first module is a pre-filtering and pre-separating module 120 shown in FIG. 1 where the contaminated groundwater 102 is subjected to the preliminary separation of materials that are not in solution, i.e., oils and greases, materials suspended in solution and solids. This preliminary filtering and separating process is completed in two phases. The first phase consists of a multi-chambered specific gravity separator 122 where suspended solids in the contaminated groundwater 102 settle out and any non-dissolved contaminants are removed. The oil and grease contaminants can be from pumps while silt and sand contaminants can be from deeper wells. The specific gravity separator 122 operates on the basis of the weight of the contaminant, i.e., the contaminant either floats or sinks. The contaminants that are removed are those that sink to the bottom or float to the surface of the contaminated groundwater 102 shown in FIG. !. The specific gravity separator 122 includes a first chamber 124 having a float valve 126 utilized to control the water level therein. The groundwater 102 having contaminants not in solution is subjected to a tortuous path interrupted by baffles 128. The contaminated groundwater 102 flows around the baffles 128 in the first chamber 124 causing the heavy contaminants to fall to the bottom of the separator 122 while the floating globs of contaminants accumulate on the surface of the groundwater 102.

A second chamber 130 is very similar to the first chamber 124 except that it contains a polypropylene screen 132 as is shown In FIG. 1. The polypropylene screen 132 aids in the separation of contaminants in the groundwater 102 because it possesses a molecular attraction to oils which causes collection of oils on the polypropylene material of the screen 132. Beads of 011 forming on the screen 132 will release from the screen 132 and float to the surface of the groundwater 102 in the separator 122. The floating oil in the separator 122 is removed by a skimmer 134 which is a mechanical device that is permanently open and enables the oil to be drained thereto, i.e., the skimmer 134 can be adjusted to collect only oil. A plurality of normally-closed ball valves 136 and piping 138 associated with the skimmer 134 are connected directly to a liquid waste holding or storage tank 140 as shown in FIG. 1 for temporarily storing the liquid waste. Solids such as sand, silt and metal components which are heavier than the contaminated groundwater 102 are drained through a second plurality of normally-closed, manually-operated, lower ball valves 142 which are manually opened to a drain line 144 for draining to a solid waste storage tank 146 for temporarily storing the solid waste. The storage tanks 140 and 146 are designed and operated to meet EPA regulations. The output of the pre-filtering and preseparating module 120 is a filtered contaminated fluid 148 as is shown in FIG. 1.

Figure 2:
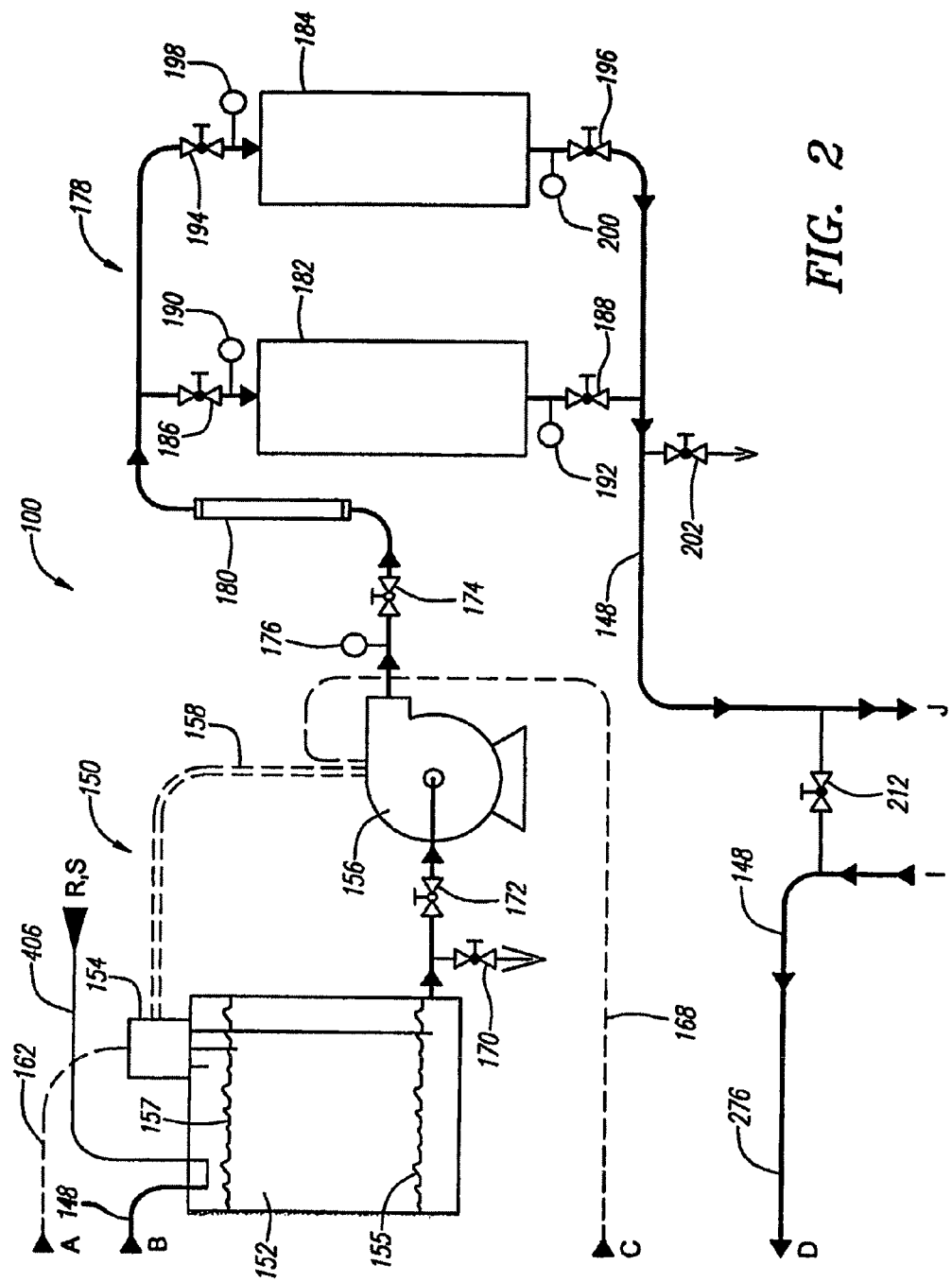
FIG. 2 is a mechanical schematic diagram showing a primary flow control module including a surge tank having a fluid level control and a first centrifugal pump, and a micron filtration bank module showing parallel first and second micron cartridge filters.

The second module is a primary flow control module 150 which receives the filtered contaminated fluid 148 in a surge tank 152 via gravity flow from the pre-filtering and preseparating module 120. The surge tank 152 shown in FIG. 2 provides the control basis for controlling the flow of the filtered contaminated fluid 148, i.e., filtered contaminated groundwater, throughout the multi-phase system 100. The surge tank 152 includes a fluid level control mechanism 154 which controls a first centrifugal pump 156. The combination of the control mechanism 154 and the first centrifugal pump 156 serve to regulate the filtered contaminated fluid 148 to a steady state flow throughout the multi-phase separation system 100. The fluid level control mechanism 154 is a three position level control designed to protect the first centrifugal pump 156. For example, when the level of the filtered contaminated fluid 148 in the surge tank 152 is low (indicated by numeral 155), the electrical power to the first centrifugal pump 156 is interrupted. This connection is indicated by a dashed control lines 158 shown in FIG. 2. likewise, when the level of the filtered contaminated fluid 148 in the surge tank 152 is high (indicated by numeral 157), the first centrifugal pump 156 is actuated, i.e., electrical power is restored.

When the level of the filtered contaminated fluid 148 is very high, the electrical power to the first centrifugal pump 156 is interrupted as is indicated by the control lines 158. Thus, the first centrifugal pump 156 is de-energized. Additionally, an electrical solenoid 160 located in the normally-open control valve 108 shown in FIG. 1 is de-energized causing the valve 108 to close. This connection is indicated by a dashed control line 162 shown in FIGS. 1 and 2. This action interrupts the flow of contaminated groundwater 102 into the multi-phase separation system 100. The first centrifugal pump 156 is also electrically connected to a high level, system shutdown control switch 164 associated with a phase reaction chamber 166 shown in FIG. 3. This connection is indicated by a dashed control line 168 shown in FIGS. 2 and 3. Thus, during system shutdown procedures, for example, when filtered contaminated fluid 148 has accumulated inside the phase reaction chamber 166, the high level control switch 164 (which is a float-type switch) is operated. This action de-energizes the first centrifugal pump 156 to terminate the flow of the filtered contaminated fluid 148 throughout the multi-phase separation system 100. After the level of filtered contaminated fluid 148 has receded in the phase reaction chamber 166, the control switch 164 returns to the off-position. Electrical power is then returned to the first centrifugal pump 156 so that fluid flow is once again established within the multi-phase separation system 100.

Other structural components associated with the primary flow control module 150 shown in FIG. 2 include a normally-closed sample valve 170 used to sample and test the filtered contaminated water 148 downstream of the surge tank 152. Additionally, there is a pair of normally-open isolation ball valves 172, 174 that can be used to isolate the first centrifugal pump 156 as, for example, to remove the pump 156 from service for maintenance and repair. Further, the isolation valve 172 can also be used to control the flow of the filtered contaminate fluid 148 out of the surge tank 152 and into the first. centrifugal pump 156, i.e., adjust the discharge flow of the surge tank 152. Additionally, located on the downstream side of the first centrifugal pump 156 is a pressure gauge 176 for indicating the fluid pressure of. the filtered contaminated fluid 148 within the range of 0-60 psig.

The third module is a micron filtration bank module 178 also shown in FIG. 2 which serves to remove fine particulate matter from the filtered contaminated fluid 148 that would otherwise enter and possibly foul the phase reaction chamber 166. The micron filtration bank module 178 Includes a visual flow meter 180 for visually determining the flow rate of the filtered contaminated fluid 148 discharged by the first centrifugal pump 156. The visual flow meter 180 is calibrated to indicate the flow rate in gallons per minute through the multi-phase separation system 100. The micron filtration bank module 178 also includes parallel micron cartridge filters 182 and 184 where the micron cartridge filter 182 is normally in operation mode and the micron cartridge filter 184 is normally in standby mode. These cartridge filters 182 and 184, which are designed to filter out particulate matter greater than five microns in diameter, are generally successful in blocking sediment and other particulate matter from entering the structure associated with the phase reaction chamber 166.

At the Input to and the output from the operational micron cartridge filter 182 is a pair of manually-operated, normally-open isolation ball valves 186 and 188 for isolating the cartridge filter 182 and a pair of pressure gauges 190, 192 for indicating the fluid pressure of the filtered contaminated fluid 148 within the range of 0-60 psig. Likewise, at the input to and the output from the standby micron cartridge filter 184 is a pair of manually operated, normally-closed isolation ball valves 194 and 196 for isolating the cartridge filter 184 and a pair of pressure gauges 198, 200 for indicating the fluid pressure of the filtered contaminated fluid 148 within the range of 0-60 psig. Also included is a normally-closed. sample valve 202 utilized to collect and test a sample of the filtered contaminated fluid 148 at this location.

Figure 4:
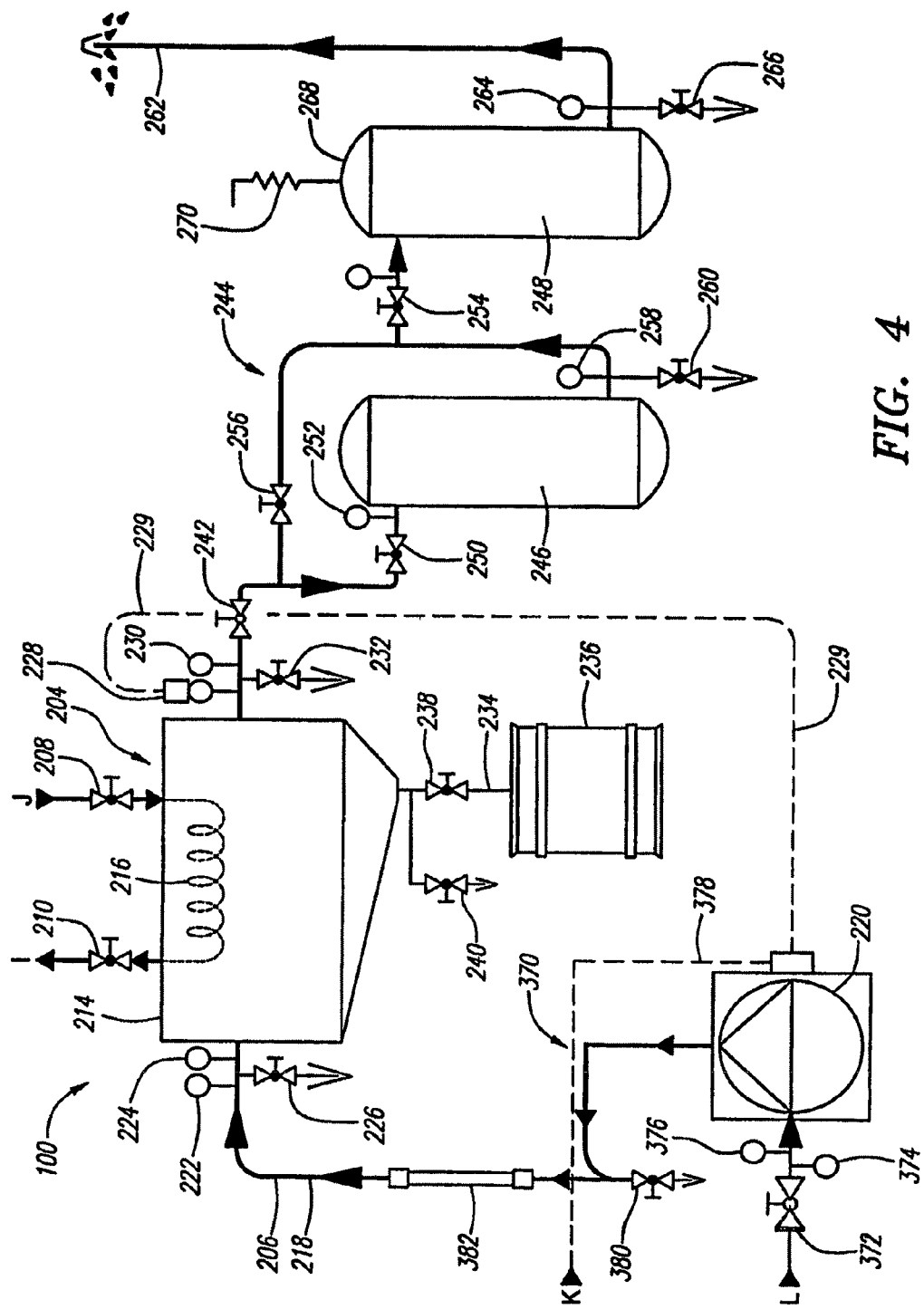
FIG. 4 is a mechanical schematic diagram showing a contaminant condenser module including a chiller dryer condenser, a contaminated liquid storage tank, a first carbon stage polisher, and a vacuum pump module including a liquid seal vacuum pump.

The fourth module is a contaminant condenser module 204 mostly shown in FIG. 4. The contaminant condenser module 204 functions as a heat exchanger which serves two purposes. The first purpose is to increase the temperature of the filtered contaminated fluid 148 and the second purpose is to condense a contaminated gas phase 206 that Is discharged by the phase reaction chamber 166. In this exchange, the temperature of the filtered contaminated fluid 148 is raised to approximately five-degrees above the ambient temperature to enhance the removal efficiency of the contaminants MTBE and VOC's in the phase reaction chamber 166. Likewise, the contaminated gas phase 206 is condensed to a liquid for temporary storage, recycling and disposal.

Figure 3:
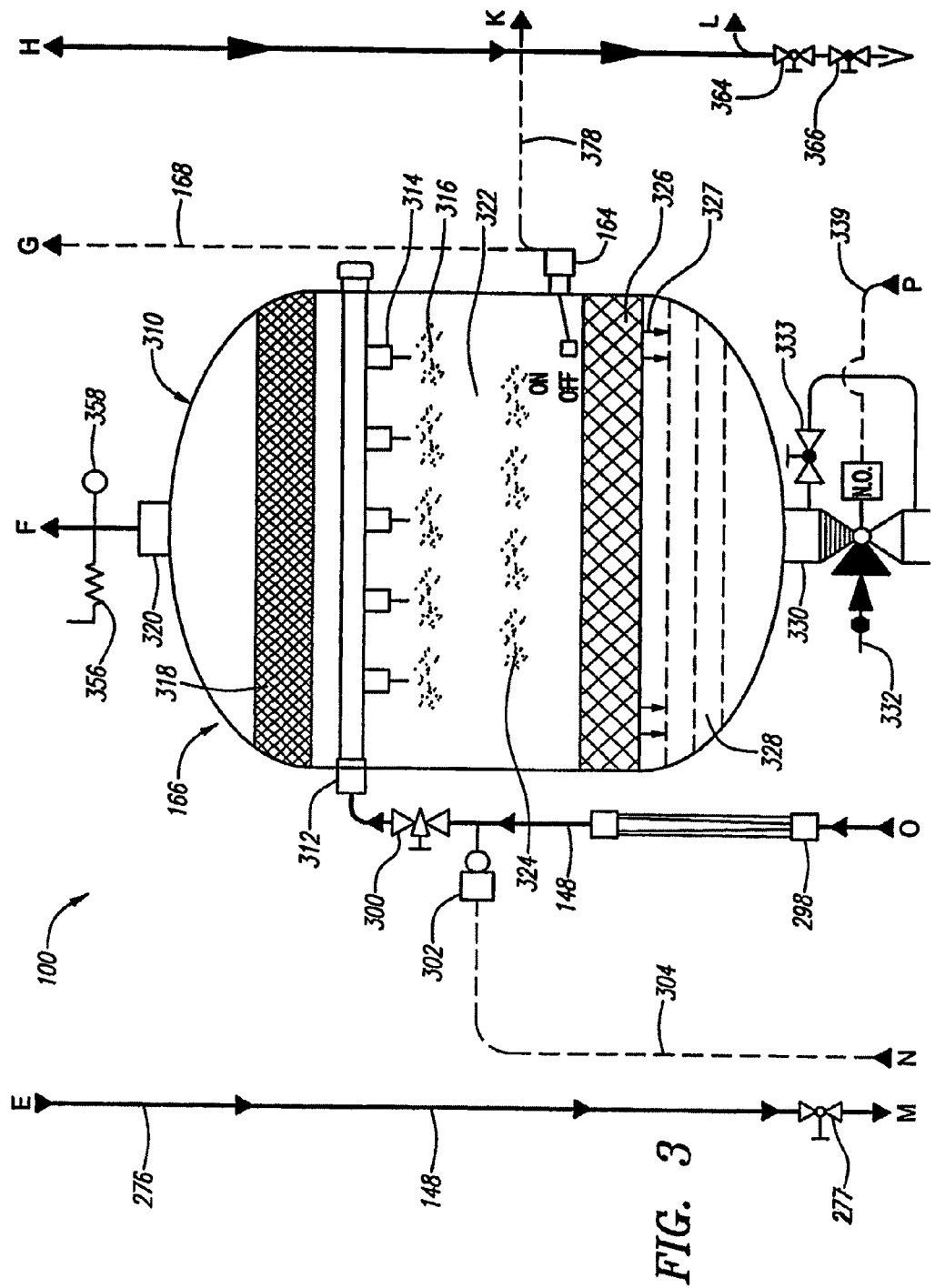
FIG. 3 is a mechanical schematic diagram showing a phase reaction chamber of a phase reaction module including a mist eliminator, a distribution header with a plurality of spray nozzles, a phase separation section, layer of synthetic packing material, an air/water distribution tray, and a first three-way control valve.

The filtered contaminated fluid 148 is directed from the micron filtration bank module 178 to a first input of the condenser module 204 via a valve arrangement. A normally-open ball valve 208 directs the contaminated fluid 148 into the condenser module 204 and a normally-open ball valve 210 directs the contaminated fluid 148 having an elevated temperature out of the condenser module 204. A normally-closed ball valve 212 serves as a bypass between valve 208 and valve 210 to isolate the condenser module 204 as shown in FIGS. 2 and 3. The construction of the condenser module 204 is shown in FIG. 4. The contaminant condenser module 204 includes a chiller dryer condenser 214 which functions as a heat exchanger and includes a tubular coil arrangement 216. The tubular coil arrangement 216 carries the filtered contaminated fluid 148 from the micron filtration bank module 178 at a temperature of approximately 65-degrees Fahrenheit in a first set of tubes. This 65-degree Fahrenheit fluid 148 traveling in the first set of tubes is interfaced in the tubular coil arrangement 216 with the contaminated gas phase 206 traveling in a second set of tubes. The contaminated gas phase 206 traveling in the second tube is transported by an environmental carrier air 218 from the phase reaction chamber 166.

Thus, the input to the condenser module 204 from the phase reaction chamber 166 via a liquid sealed vacuum pump 220 Is the contaminated gas phase 206 and the environmental carrier air 218 as shown in FIG. 4. At the input to the chiller dryer condenser 214 from the phase reaction chamber 166, there is (a) a pressure gauge 222 for measuring the pressure of the contaminated gas phase 206 in the range of 0-10 psig, a temperature gauge 224 for measuring the temperature of the contaminated gas phase 206 within the range of 0-150 degrees Fahrenheit, and a normally-closed sample valve 226 for acquiring a gas sample at this location. At the output to the chiller dryer condenser 214, there is a pressure indicator/switch 228 which is electrically interlocked to the vacuum pump 220 as Indicated by dashed control line 229 so that a dramatic change in pressure at the output of the chiller dryer condenser 214 causes the vacuum pump to de-energize. Also located at the output of the chiller dryer condenser 214 is a temperature gauge 230 for measuring the temperature at this location within the range of 0-100 degrees Fahrenheit, and a normally-closed, vapor/condensate sample valve 232 for acquiring an air sample at this location. The pressure temperature instrumentation at both the input and output of the chiller dryer condenser 214 enables the determination of the change of temperature and change of pressure across the chiller dryer condenser 214.

As the contaminated gas phase 206 and atmospheric carrier air 218 pass across the tubular coil arrangement 216 within the chiller dryer condenser 214, the contaminated gas phase 206 is condensed into a contaminated liquid 234 and subsequently drained into a contaminated liquid storage tank 236 via a normally-open ball valve 238 as shown in FIG. 4. The condensing of the contaminated gas phase 206 into the contaminated liquid 234 is a second change of phase of the MTBE and VOC contaminants. The contaminants MTBE and VOC's (from the contaminated gas phase 206) are temporarily stored in the contaminated liquid storage tank 236 prior to being recycled or destroyed. A normally closed vapor/condensate sample valve 240 enables the drawing of a sample of the contaminated liquid 234 at this location. Simultaneously, the carrier air 218 which is at approximately one atmosphere and which has been separated from the contaminated gas phase 206 passes through the chiller dryer condenser 214 to a normally-open discharge ball valve 242 to a first carbon stage polisher 244.

The first carbon stage polisher 244 includes a first stage vapor carbon polisher 246 and a second stage vapor carbon polisher 248 employed to filter out residual contaminants that may be contained within the carrier air 218 as required by the Environmental Protection Agency. The environmental carrier air 218 is passed through a normally-open ball valve 250 to the first stage vapor carbon polisher 246 where the input to the carbon polisher 246 includes a pressure gauge 252 which measures the pressure of the carrier air within the range of 0-10 psig. The carrier air 218 discharged by the first stage vapor carbon polisher 246 is directed to the second stage vapor carbon polisher 248 through a normally open ball valve 254 and also to a normally-closed ball valve 256 as shown in FIG. 4. A pressure gauge 258 which measures the pressure of the carrier air 218 within the range of 0-10 psig is positioned at the output of the first stage vapor carbon polisher 246 as is a normally-closed, vapor/condensate sample valve 260. The carrier air 218 is then passed through the second stage vapor carbon polisher 248 and discharged through an exhaust stack 262 to atmosphere. The exhaust stack 262 meets the height requirements of the EPA regulations. The output at the second stage vapor carbon polisher 248 also includes a pressure gauge 264 that measures the pressure of the carrier air 218 within the range of 0-10 psig, and a normally-closed vapor/condensate sample valve 266. Also, mounted on the top surface 268 of the second stage vapor carbon polisher 248 is a pressure relief valve 270 for relieving pressure within the carbon polisher 248.

Figure 5:
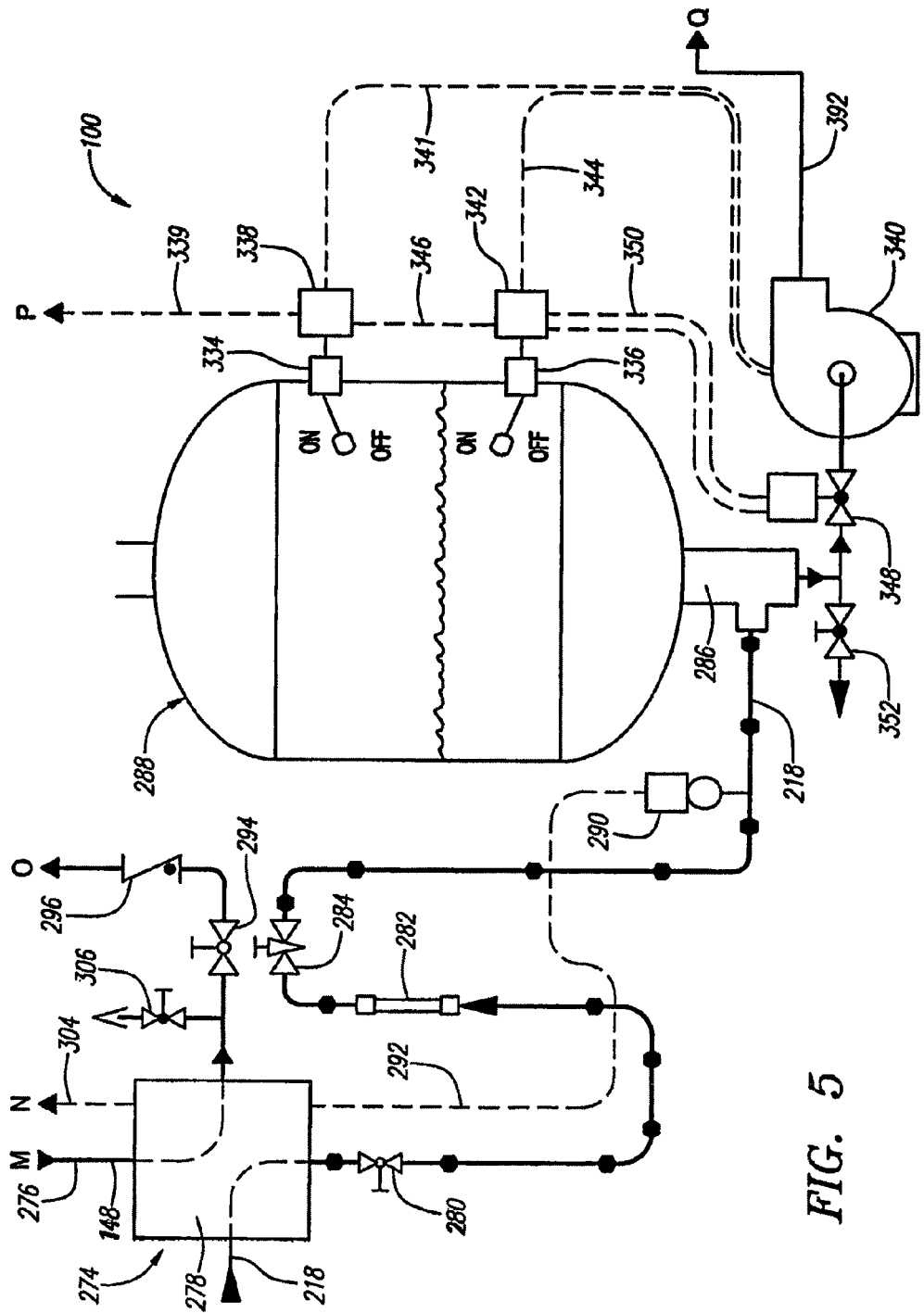
FIG. 5 is a mechanical schematic diagram showing a vacuum liquid discharge tank of the phase reaction module including a second centrifugal pump for pumping discharge liquid, and a media temperature equalization module including a heat exchanger.

The fifth module is a media temperature equalization module 274 which functions as a heat exchanger to receive and equalize the temperature of (a) the filtered contaminated fluid 148 from the tubular coil arrangement 216 of the chiller dryer condenser 214, and (b) the environmental carrier air 218 as shown in FIG. 5. The filtered contaminated fluid 148 exiting the ball valve 210 connected to the tubular coil arrangement 216 of the chiller dryer condenser 214 shown on FIG. 4 is transmitted via system piping 276 as shown on the bottom of FIG. 2 and FIG. 1, and also the left side of FIG. 3 to the media temperature equalization module 274 shown on the left side of FIG. 5. The filtered contaminated fluid 148 passes through a normally-open isolation ball valve 277 positioned I in the system piping 276 shown in FIG. 3 upstream of the equalization module 274. Concurrent with the flow of the filtered contaminated fluid 148 through the chiller dryer condenser 214, the atmospheric carrier air 218 is introduced into a water-air heater 278 of the media temperature equalization module 274 as shown in FIG. 5.

The function of the water-air heater 278 is to equalize the temperature of the environmental carrier air 218 with the temperature of the filtered contaminated fluid 148 prior to the media combination being introduced into the phase reaction chamber 166. The environmental carrier air 218 is heated by the water-air heater 278 to approximately five degrees above ambient temperature to enhance the kinetic efficiency of the phase reaction chamber 166. It is desirable that the temperature of the filtered contaminated fluid 148 be the same as the environmental carrier air 218 to avoid having a differential temperature exist within the phase reaction chamber 166. If a differential temperature exists within the phase reaction chamber 166, this might initiate a separate reaction such as scaling where the salts of the contaminants (i.e., MTBE and VOC's) form from the filtered contaminated fluid 148. If scaling did occur, the inside of the phase reaction chamber 166 could be fouled resulting in degraded performance.

The heated carrier air 218 exits the water-air heater 278 through a normally-open isolation ball valve 280 which in combination with the isolation ball valve 277 shown on FIG. 3 enables the water-air heater 278 to be removed from the system for repairs and maintenance. An air flow meter 282 downstream of the isolation valve 280 is utilized to measure the volume of carrier air 218 passing there through and is a visual method for regulating the flow of carrier air 218 into the phase reaction chamber 166. A air needle valve 284 is employed to control the flow of the carrier air 218 into an air intake section 286 of a vacuum liquid discharge tank 288 also shown in FIG. 5. The needle valve 284 can be manually adjusted in accordance with a particular type of contaminant, i.e., either MTBE or VOC's. Between the air needle valve 284 and the air intake section 286 of the vacuum liquid discharge tank 288 is a first temperature indicator and control 290 which monitors the temperature of the carrier air 218 entering the vacuum liquid discharge tank 288. The first temperature indicator and control 290 is in electrical communication with the water-air heater 278 for controlling the temperature of the carrier air 218. This connection is illustrated by the dashed control line 292 shown in FIG. 5.

The filtered contaminated fluid 148 is directed from the water-air heater 278 to the phase reaction chamber 166 via a normally-open isolation ball valve 294 and a ball check valve 296 which prevents back flow of the contaminated fluid 148 as shown in FIG. 5. A fluid flow meter 298 is employed to measure the volume of the filtered contaminated fluid 148 in gallons per minute being directed to the phase reaction chamber 166 as is shown in FIG. 3. Beyond the fluid flow meter 298 is a fluid needle valve 300 utilized to control the flow of the filtered contaminated fluid 148 into the phase reaction chamber 166. Connected between the fluid flow meter 298 and the fluid needle valve 300 is a second temperature indicator and control 302 which monitors the temperature of the filtered contaminated fluid 148 entering the phase reaction chamber 166. The second temperature indicator and control 302 is in electrical communication with the water-air heater 278 shown in FIG. 5 for controlling the temperature of the filtered contaminated fluid 148. This connection is illustrated by the dashed control line 304 shown in FIGS. 3 and 5. A normally-closed fluid sample valve 306 is positioned just outside the fluid discharge side of the water-air heater 278 to enable a sample of the filtered contaminated fluid 148 to be obtained at this location.

A sixth module is a phase reaction module 310 which Is generally comprised of the phase reaction chamber 166 shown in FIG. 3 and the vacuum liquid discharge tank 288 shown in FIG. 5. The general function of the phase reaction module 310 is to change the phase of the filtered contaminated fluid 148 from a liquid phase to a vapor phase and to separate the liquid phase from the contaminated vapor phase for processing and recovery. The filtered contaminated fluid 148 travels from the water-air heater 278 of the media temperature equalization module 274 through the fluid flow meter 298 which measures the rate of flow of the contaminated fluid 148. The fluid needle valve 300 controls the flow of the contaminated fluid 148 to the phase reaction chamber 166 of the phase reaction module 310. Simultaneously, the pre-heated carrier air 218 enters the air Intake section 286 of the vacuum liquid discharge tank 288. Thus, the pre-heated carrier air 218 and the filtered contaminated fluid 148 enter the phase reaction module 310 at the same time.

It is noted that the multi-phase separation system 100 utilizes a low energy, high vacuum environment to reduce the vapor pressure of the MTBE and/or VOC contaminant below the boiling point so that the MTBE and/or VOC contaminant vaporizes off of the filtered contaminated fluid 148. Thus, the low energy, high vacuum environment is employed to convert the MTBE and/or VOC contaminants from a water soluble state to a vapor state that can be condensed into a liquid for recycling or disposal. The phase reaction chamber 166 is a high vacuum vessel that operates below the vapor pressure of MTBE and is designed with internal structures that enhance the kinetic efficiencies to the extent that the MTBE and/or VOC contaminants can be effectively stripped, i.e., removed from, the filtered contaminated fluid 148. The phase reaction module 166 directs and controls both the liquid and vapor phases of the removal process.

The filtered contaminated fluid 148 enters a distribution header 312 In the phase reaction chamber 310 as is shown in FIG. 3. A plurality of atomizer sprayer nozzles 314 mechanically communicate with the distribution header 312 to convert the filtered contaminated fluid 148 to a contaminated mist 316 as shown in FIG. 3. The contaminated mist 316 is distributed within the phase reaction chamber 166 to assume the maximum surface area exposure of the MTBE and VOC contaminants to the high vacuum environment. Located within the phase reaction chamber 166 and above the distribution header 312 is a mist eliminator 318. The mist eliminator 318 can comprise a stainless steel mesh which is utilized to intercept that portion of the contaminated mist 316 moving toward a top output port 320 of the phase reaction chamber 166. The portion of the contaminated mist 316 intercepted by the mist eliminator 318 is caused to condense back into the contaminated fluid 148 and drain back into the phase reaction chamber 166. Thus, the mist eliminator 318 prevents any portion of the contaminated mist 316 from exiting the top output port 320 and entering the liquid seal vacuum pump 220. The following is a description of the phase reaction process to which the contaminated mist 316 including the MTBE and VOC contaminates are subjected to In the phase reaction chamber 166. The phase reaction process which converts the MTBE and VOC contaminants in the contaminated mist 316 to a vapor or gas phase occurs in a phase separation region 322 because of the exposure of the contaminated mist 316 to the low energy, high vacuum environment and also the temperature of the media, i.e., the carrier air 218 and filtered contaminated fluid 148, entering the phase reaction chamber 166. The high vacuum environment within the phase reaction chamber 166 can be a full atmosphere. The low energy, high vacuum environment of the phase reaction chamber 166 is employed to reduce the vapor pressure of the MTBE and VOC contaminants below their boiling point so that the MTBE and VOC contaminants reach their "bubble point", i.e., boiling point, and vaporize off of the contaminated mist 316. This action results in a first change of phase of the MTBE and VOC contaminants from (a) the contaminated mist 316 to (b) the contaminated gas phase 206 and a liquid mist phase 324. In effect, the low energy, high vacuum environment and temperature of the input media have caused the contaminated mist 316 to be separated into a contaminated gas phase 206 and a liquid mist phase 324. Thus, the low energy, high vacuum environment of the phase reaction chamber 166 Is employed to convert the MTBE and VOC contaminants from a water soluble state to a vapor gas state that can be condensed into the contaminated liquid 234 in the chiller dryer condenser 214 (see FIG. 4) in the second change of phase for recycling or disposal.

The contaminated gas phase 206 will be carried upward through the phase reaction chamber 166 by the environmental carrier air 218 entering the air intake section 286 of the vacuum liquid discharge tank 288. Likewise, the liquid mist phase 324 will gravity flow down to the bottom of the phase reaction chamber 166. Located at the bottom of the phase reaction chamber 166 is a layer of packing material 326 through which the liquid mist phase 324 filters through. The packing material can be comprised of, for example, nylon-terelet packing which provides a large surface for the liquid mist phase 324 to contact and to recombine into liquid droplets indicated by the arrows 327 shown in FIG. 3. An excessive accumulation of the liquid droplets 327, i.e., of fluid, in the phase reaction chamber 166 can activate the high level, system shutdown control switch 164 shown in FIG. 3 to de-energize the first centrifugal pump 156 shown in FIG. 2. The liquid droplets 327 then gravity drain as fluid down to an air-water distribution tray 328. The air-water distribution tray 328 is designed to equalize the distribution of the carrier air 218 and the liquid droplets 327. Thus, in the air-water distribution tray 328, the water droplets 327 flow downward from the phase reaction chamber 166 and the carrier air 218 flows upward from the vacuum liquid discharge tank 288. The liquid droplets 327 flow downward from the air-water distribution tray 328 to a first three-way control valve 330, and ultimately to the vacuum liquid discharge tank 288.

The first three-way control valve 330 includes inputs from (a) the phase reaction chamber 166, (b) the vacuum liquid discharge tank 288, and (c) a vent 332 to atmosphere.

The first three-way control valve 330 passes water downward and directs carrier air 218 upward. The first three-way control valve 330 is normally closed to the atmosphere vent 332 and is normally open between the phase reaction chamber 166 and the vacuum liquid discharge tank 288. In this mode, the liquid droplets 327 can pass to the vacuum liquid discharge tank 288 and accumulate therein. After sufficient accumulation of liquid droplets 327, the vacuum liquid discharge tank 288 must be emptied. In order to accomplish this, the first three-way control valve 330 must be opened to atmosphere and to the vacuum liquid discharge tank 288 and closed to the phase reaction chamber 166. In this manner, the high vacuum environment in the phase reaction chamber 166 is maintained and the vacuum liquid discharge tank 288 is at atmospheric pressure. Also included is a normally closed bypass ball valve 333 that bypasses the entire first three-way control valve 330 in case of valve malfunction or for isolation purposes. The first three-way control valve 330 is operated by a high level liquid control switch 334 and a low level liquid control switch 336 located in the vacuum liquid discharge tank 228 shown in FIG. 5. When the high level liquid control switch 334 is actuated, the normally-open status of the first three-way control valve 330 is changed to expose the vacuum liquid discharge tank 228 to atmospheric pressure. The high level switch 334 (which is a float-type switch) actuates a controller 338 which is electrically connected to a second centrifugal pump 340 as indicated by a dashed control line 341. The second centrifugal pump 340 is energized to remove the liquid accumulated in the vacuum liquid discharge tank 288. When the low level liquid control switch 336 is actuated, the first three-way control valve 330 returns to the normally-open position between the phase reaction chamber 166 and the vacuum liquid discharge tank 288 (see dashed control line 339 on FIGS. 3 and 5). The actuated low level liquid control switch 336 (which is a float type switch) operates a controller 342 which is also electrically connected to the second centrifugal pump 340 as indicated by a dashed control line 344. The second centrifugal pump 340 is then de-energized. An electrical interlock between the controller 338 of the high level liquid control switch 334 and the controller 342 of the low level liquid control switch 336 is indicated by a dashed control line 346.

Fluid, i.e., liquid droplets 327, that has accumulated and is being drained from the vacuum liquid discharge tank 288 is directed out of the air intake section 286 at the bottom of the vacuum liquid discharge tank 288. A normally-closed fluid discharge control valve 348 is connected between the air intake section 286 and the second centrifugal pump 340 as shown in FIG. 5. The control valve 348 is electrically connected to the controller 338 and the controller 342 as indicated by a pair of dashed control lines 350. The position of discharge control valve 348 is determined by the high level fluid control switch 334 and the low level fluid control switch 336. If the high level switch 334 is actuated and the second centrifugal pump 340 is operational, the discharge control valve 348 must be open. Likewise, If the low level switch 336 Is actuated and the second centrifugal pump 340 is de-energized and non-operational, the discharge control valve 348 must be closed. An additional normally-closed ball valve 352 is also connected to the air intake section 286 for use as a drain or sample valve at that location. Finally, a normally-open isolation ball valve 354 (shown in FIG. 6) is located at the output of the second centrifugal pump 340 to isolated the discharge side of the pump 340 if necessary as, for example, for maintenance or repair.

The atmospheric carrier air 218 enters the air intake section 286 of the vacuum liquid discharge tank 288 which is normally under vacuum when the first three-way control valve 330 Is in the normally-open position. Thus, the high vacuum environment that exists in the phase reaction chamber 166 also exists in the vacuum liquid discharge tank 288 when the first three-way control valve 330 is In the normally-open position. The vacuum in the phase reaction chamber 166 and the vacuum liquid discharge tank 288 serves as a low energy prime mover for the carrier air 218. The carrier air 218 is drawn upward through the vacuum liquid discharge tank 288 (i.e., bubbling upward through the accumulated liquid droplets 327), and through the first three-way control valve 330 at the bottom of the phase reaction chamber 166. It Is noted that the carrier air 218 flows upward through the center of the first three-way valve 330 while the liquid droplets 327 flow down the sidewalls of the first three-way control valve in accordance with the Corrolus Effect. Then the carrier air 218 passes upward through the air-water distribution tray 328 where the carrier air 218 is distributed evenly with the downward draining liquid droplets 327. Thereafter, the carrier air 218 passes upward through the layer of packing material 326 and into the phase separation region 322 of the phase reaction chamber 166. In the phase separation region 322, the MTBE and VOC contaminants of the contaminated mist 316 have been separated out and are now included in the contaminated gas phase 206. The contaminated gas phase 206 moves upward with the carrier air 218 (as drawn by the high vacuum environment) through the mist eliminator 318 and out the top output port 320 of the phase reaction chamber 166 to the vacuum pump 220. Outside of the top output port 320 of the phase reaction chamber 166 Is a safety vacuum relief valve 356 which opens and maintains the vacuum environment at a set level to avoid damage to the phase reaction chamber 166 and/or the vacuum pump 220. Further, there is included a vacuum gauge 358 for measuring the vacuum within the range of 0-30" Hg as shown in FIG. 3. Further, a pressure controller 360 of a pressure gauge 361 is electrically programmed to control a pressure control valve 362 to maintain a set pressure within the phase reaction chamber 166 as is shown on the bottom of FIG. !. The electrical connection between the program controller 360 and the pressure control valve 362 is indicated by the dashed control line 363. The end the vacuum line exiting the phase reaction module 310 includes a normally-open isolation ball valve 364 to Isolate the vacuum line and a liquid trap and vapor/condensate sample valve 366 as shown on the right side of FIG. 3. The liquid trap and vapor/condensate sample valve 366 is utilized to trap any condensed portions of the contaminated gas phase 206 for preventing slugs of fluids from entering the vacuum pump 220.

The seventh module is a vacuum pump module 370 which provides the driving mechanism for the entire multi-phase separation system 100. The vacuum pump module 370 includes the liquid seal vacuum pump 220 which is capable of drawing up to one full atmosphere of vacuum as shown in FIG. 4. Connected to the vacuum line exiting the phase reaction chamber 166 is a normally-open isolation ball valve 372, a temperature gauge 374 measuring the temperature of the entering contaminated gas phase 206 within the range of 0-100 degrees Fahrenheit, and a vacuum gauge 376 reading the vacuum within the vacuum line within the range of 0-30" Hg. Further, the output of the vacuum pump 220 is under a pressure of approximately 0.5 psig. As shown in FIG. 4, the vacuum pump 220 is electrically connected to the high level, system shutdown control switch 164 connected in the phase reaction chamber 166 as shown in FIG. 3. This connection is indicated by the dashed control line 378 shown in FIGS. 3 and 4. Thus, if a high level of fluid accumulates in the phase reaction chamber 166, the shutdown control switch 164 shown in FIG. 3 actuates and disables the vacuum pump 220 shown in FIG. 4, and de-energizes the first centrifugal pump 156 shown in FIG. 1. Also, the vacuum pump 220 is electrically connected to the pressure indicator switch 228 at the output of the chiller dryer condenser 214 as Indicated by the dashed control line 229 as shown in FIG. 4.

Connected to the output of the vacuum pump 220 is a normally-closed condensate drain trap 380 utilized to trap any condensed portions of the contaminated gas phase 206 being carried by the carrier air 218 through the vacuum pump 220. Also connected to the output of the vacuum pump 220 is a vapor flow meter 382 employed to measure the flow rate of the contaminated gas phase 206 as it enters the chiller dryer condenser 214 shown in FIG. 4. As previously discussed with regard to the contaminant condenser module 204, the contaminated gas phase 206 passes across the tubular call arrangement 216 within the chiller dryer condenser 214, and is condensed into the contaminated liquid 234 and is stored in the contaminated liquid storage tank 236. The atmospheric carrier air 218 is separated from the contaminated gas phase 206 during the condensation process in the chiller dryer condenser 214 and is then directed to the first carbon stage polisher 244 for vapors prior to being discharged via the exhaust stack 262 shown in FIG. 4.

Figure 6:
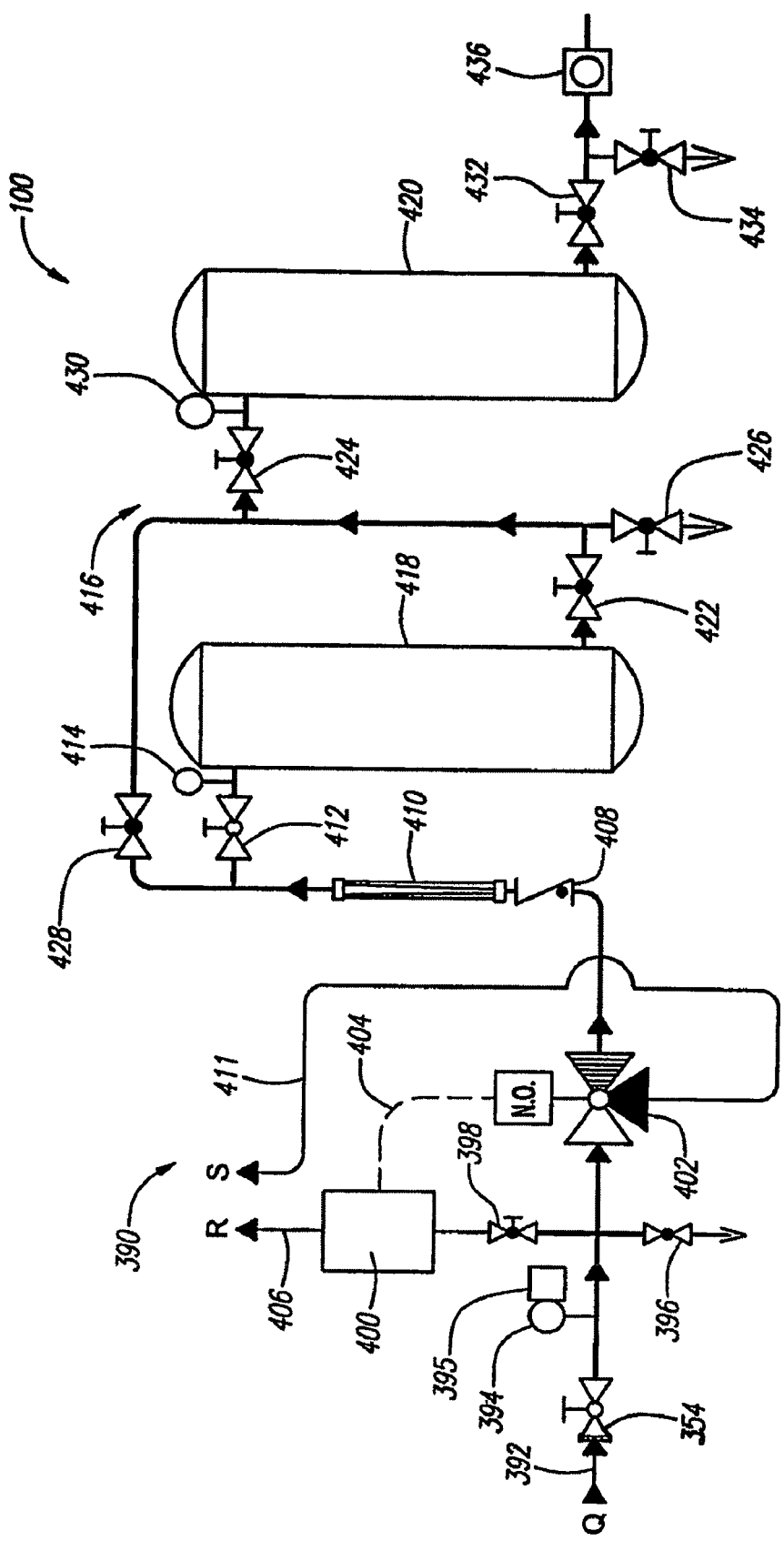
FIG. 6 is a mechanical schematic diagram of a liquid discharge monitoring module showing a flow analyzer, a second three-way control valve, a second carbon stage polisher, and a flow totalizer.

The eighth and final module is a liquid discharge monitoring module 390 which functions to constantly monitor a discharge liquid 392 expelled from the second centrifugal pump 340 via the normally-open isolation ball valve 354 shown in FIG. 6.

The liquid discharge monitoring module 390 constantly monitors the discharge liquid 392 to ensure that its parameters are in compliance with all applicable agency regulations. The discharge liquid 392 flows to a pressure indicator 394/pressure gauge 395 which measures fluid pressure within the range of 0-30 psig. A normally-closed fluid sample valve 396 is positioned to draw a sample of the discharge liquid 392 and a normally-open isolation ball valve 398 leads to flow analyzer 400 as is shown in FIG. 6. The flow analyzer 400 is utilized to analyze a side stream of the discharge liquid 392 to ensure that it meets both EPA and applicable state agency discharge requirements. The liquid discharge monitoring module 390 also includes a second three-way control valve 402 to direct the flow of the discharge liquid 392. The flow analyzer 400 is electrically connected to and controls the position of the second three-way control valve 402 as is indicated by the dashed control line 404. The output of the flow analyzer 400 is a data readout that is recorded in a water purity data log (not shown), or suitable data base, or can be downloaded via a modem (not shown).

A quarter-gallon trickle of the discharge liquid 392 is returned from the flow analyzer 400 shown in FIG. 6 to the surge tank 152 of the primary flow control module 150 shown in FIG. 2. This continuous trickle of discharge liquid 392 is indicated by the arrow 406 appearing on both FIGS. 2 and 6. As a result of the analysis of the discharge liquid 392 by the flow analyzer 400, the quality of the discharge liquid 392 is either in specification or out of specification. If the analysis determines that the quality of the discharge liquid 392 is in specification, the second three-way control valve 402 remains In the normally-open position and the discharge liquid 392 is directed to an Influent control valve 408 and a flow meter 410 that reads the volume of incoming discharge liquid 392 in gallons per minute. If the analysis by the flow analyzer 400 determines that the quality of the discharge liquid 392 Is out of specification, the flow analyzer 400 sends an electrical signal to the normally-open second three-way control valve 402 to cycle all of the discharge liquid 392 back to the surge tank 152 of the primary flow control module 150 shown in FIG. 2. This situation-is indicated by the arrowhead 411 shown in FIG. 6.

Downstream of the flow meter 408 Is a normally-open ball valve 412 and a pressure gauge 414 which reads the water pressure of the discharge liquid 392 within the range of 0-30 psig. The discharge liquid 392 then enters a second carbon stage polisher 416 for fluids for filtering out any residual contaminants in the discharge liquid 392 as is shown in FIG. 6. The second carbon stage polisher 416 comprises a first stage fluid carbon polisher 418 and a second stage fluid carbon polisher 420. The output of the first stage fluid carbon polisher 418 is controlled by a normally-open isolation ball valve 422 which leads to normally-open isolation ball valve 424 feeding to the second stage fluid carbon polisher 420. A normally-closed fluid sample valve 426 is also connected to the output of the first stage fluid carbon polisher 418. The flow meter 410 also feeds to a normally-closed bypass valve 428 which bypasses the first stage fluid carbon polisher 418 and feeds directly to the second stage fluid carbon polisher 420. The input to the second stage fluid carbon polisher 420 also includes a pressure gauge 430 for reading the pressure of the discharge liquid 392 within the range of 0-30 psig. The output of the second stage fluid carbon polisher 420 includes a normally open isolation ball valve 432, a normally-closed fluid sample valve 434 and a flow totalizer 436 as required by the Environmental Protection Agency for documenting the amount of discharge liquid 392 outputted.

In summary, the most fundamental embodiment of the multi-phase separation system 100 for use in removing MTBE and VOC contaminants from fluids includes a prefiltering module 120 for receiving and filtering a contaminated fluid 102 to provide a filtered contaminated fluid 148. A condenser module 204 receives the filtered contaminated fluid 148 and a contaminated gas phase 206 for condensing the contaminated gas phase 206 to a contaminated liquid 234. A phase reaction module 310 comprising a phase reaction chamber 166 converts the filtered contaminated fluid 148 to a contaminated mist 316 wherein the contaminated mist 316 is subjected to a low energy, high vacuum environment for providing a first change of phase by separating into a contaminated gas phase 206 and a liquid mist phase 324. The contaminated gas phase 206 is carried out of the phase reaction chamber 166 by a carrier air 218. A vacuum pump 220 provides the low energy, high vacuum environment in the phase reaction chamber 166 and delivers the contaminated gas phase 206 to the condenser module 204 for condensation to provide a second change of phase.

The present invention provides novel advantages over other systems designed to remove contaminants from fluids such a groundwater. A main advantage of the multiphase separation system 100 is that a pre-filtered and preheated combination of contaminated fluid 148 and environmental carrier air 218 is fed to a phase reaction module 310 wherein the contaminated fluid 148 is atomized to a contaminated mist 316 and then subjected to a low energy, high vacuum environment in a phase reaction chamber 166 to be separated into a contaminated gas phase 206 and a liquid mist phase 324. The liquid mist phase 324 drains to a vacuum liquid discharge tank 288 and is recovered as fresh discharge fluid 392 while the contaminated gas phase 206 is carried out of the phase reaction chamber 166 by the carrier air 218 via a vacuum pump 220. The contaminated gas phase 206 is then condensed to a contaminated liquid 234 in a chiller dryer condenser 214 and drained to contaminated liquid storage tank 236 for recycling or destruction. The carrier air 218 is then filtered and released to atmosphere. Thus, all components of the contaminated fluid 148 are released to the environment or recycled. The chiller dryer condenser 214 uses the heat derived from the contaminated gas phase 206 to preheat the filtered contaminated fluid 148. The pre-heated and pre-filtered contaminated fluid 148 and carrier air 218 increase the efficiency of the multi-phase separation system 100. A first three-way control valve 330 enables the vacuum liquid discharge tank 288 to be drained while maintaining the high vacuum environment in the phase reaction chamber 166. The vacuum pump 220 provides a true high vacuum environment of up to one atmosphere in the phase reaction chamber 166. The flow analyzer 400 and second three-way control valve 402 enables substandard quality discharge fluid 392 to be recycled back through the multi-phase separation system 100 for further processing.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such modifications, applications and embodiments within the scope of the present invention.

What is claimed is:

1. A method of separating volatile organic compounds from fluids using multiple phase changes in a multi-phase separation system comprising:

providing a fluid containing said volatile organic compounds and materials not in solution;

introducing the fluid into a pre-filtering module to separate materials not in solution from the fluid to form a filtered fluid;

increasing the temperature of said filtered fluid above ambient temperature in a condenser, to enhance the removal of said volatile organic compounds;

directing the filtered fluid to a phase reaction module having a vacuum environment for converting the filtered fluid to a vapor mist;

condensing the vapor mist into a liquid using said condenser; and providing a control mechanism to regulate the filtered fluid to a steady state flow through said multi-phase separation system.

2. The method of claim 1, further comprising converting the filtered fluid to a vapor mist and a liquid mist.

3. The method of claim 2, further comprising directing the liquid mist into a discharge tank by gravity flow.

4. The method of claim 1, wherein the fluid comprises methyl tertiary-butyl ether.

5. The method of claim 4, further comprising reducing a vapor pressure of the methyl-tertiary-butyl ether below its boiling point in the phase reaction module.

6. The method of claim 1, wherein the phase reaction module comprises a plurality of atomized sprayer nozzles for converting the filtered fluid to the vapor mist.

7. The method of claim 1, wherein the pre-filtering module comprises a specific gravity separator.

8. The method of claim 1, wherein the pre-filtering module comprises a polypropylene screen.

9. The method of claim 1, further comprising providing a media temperature equalization module in fluid communication with the condenser.

10. The method of claim 1, further comprising converting the vapor mist to a gas phase.

11. The method of claim 10, further comprising introducing a carrier air to carry the gas phase upwards through the phase reaction module.

* * * * *